F. A. ELLIS.
MANUFACTURE OF WHEELS.
APPLICATION FILED DEC. 9, 1914.
1,134,674.
Patented Apr. 6, 1915.
Fig. 1.
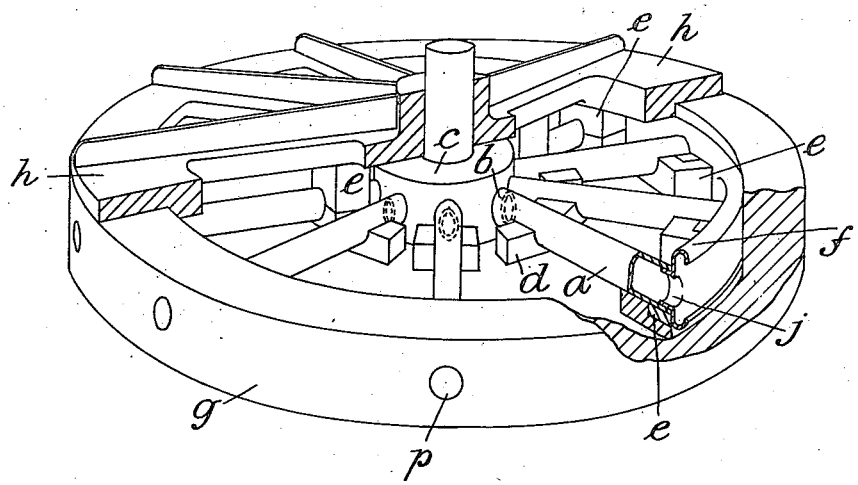
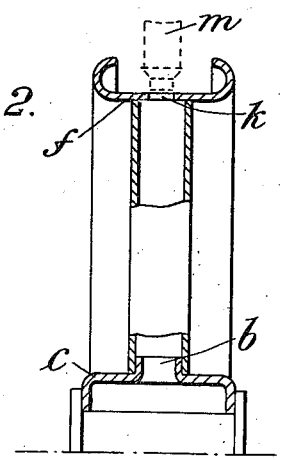
Fig. 2.
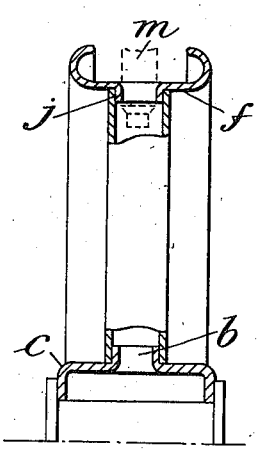
Fig. 3.
Fig. 4.
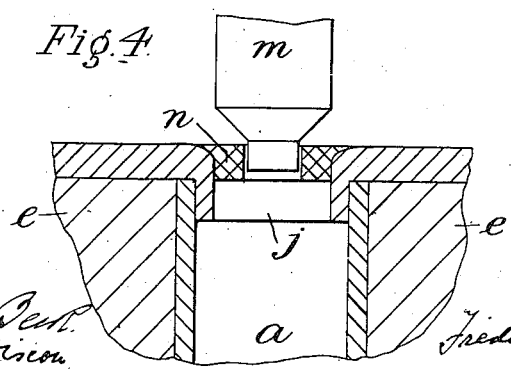
Witnesses.
Alexander Edward Peak
Henry Edward Dixon
Inventor:
Frederick Arthur Ellis

UNITED STATES PATENT OFFICE.

FREDERICK ARTHUR ELLIS, OF LONDON, ENGLAND.

MANUFACTURE OF WHEELS.

1,134,674.  Specification of Letters Patent.  Patented Apr. 6, 1915.

Application filed December 9, 1914. Serial No. 876,203.

*To all whom it may concern:*

Be it known that I, FREDERICK ARTHUR ELLIS, a subject of the King of Great Britain, residing at London, England, have invented new and useful Improvements in the Manufacture of Wheels, of which the following is a specification.

This invention relates to a new or improved method of manufacture of what are known as all-steel wheels such as are more particularly used as road-wheels for motor and other vehicles.

The invention consists in the method of assembling the several parts, that is to say the hub and rim with the several radiating spokes which unite with these in forming the wheel. The hub is provided with suitable projections of a shape to conform with that of the section of the spoke. The spokes are preferably tubular and are placed on the aforesaid projections on the hub, the outer ends extending radially to the inner circumference of the rim; which is of the ordinary standard type, in one jointless piece to which is applied the rubber or pneumatic tire. The hub together with the spokes having been placed in position within the rim, and the whole being inclosed in a suitable mold or jig, by any suitable means the rim is pierced from its exterior and a small portion thereof is pressed into the interior of each of the hollow spokes, thereby fixing the several parts firmly together. The inner and outer ends of the spokes are afterward preferably autogenously welded to the projections on the hub and to the projections formed on the interior of the rim as above described respectively.

Rims prepared with projections for the reception of the spokes are already known and naturally involve the use of complicated sectional hubs and other more or less expensive means for the utilization of same and the assemblage of the several parts of the wheel, whereas by my improved method the ordinary rim of commerce is employed, and the hub may be and preferably is of an integral type with the projections provided thereon to receive the spokes.

In order that my invention may be clearly understood, I will describe the same with the aid of the accompanying drawing in which—

Figure 1 shows in perspective the method of assembling the several parts in the formation of a wheel constructed in accordance with my invention. Fig. 2 is a part section showing the spoke of a wheel in place ready to be fixed. Fig. 3 a similar view after the spoke has been fixed, and Fig. 4 shows diagrammatically what takes place in the method of fixing or forming the projection or spigot on the interior circumference of the rim.

Similar letters of reference relate to like parts in all the figures of the drawings.

It will be seen that the tubular spokes $a$ are threaded or passed over the projections $b$ on the hub $c$, the said spokes being supported and held in position by die-blocks $d$ and $e$ disposed adjacent to the hub $c$ and the rim $f$ respectively, the several parts being placed within a mold or jig $g$ and held or clamped in position by a suitable cover or clamping plate $h$ to which is attached corresponding die-blocks $d$ and $e$ to complete the supporting or clamping effect on each of the individual spokes $a$. These several parts having been placed in the mold as described, the spokes are fixed in their respective positions by the method of pressing out from the material of the rim itself the spigot or projection $j$ in the manner illustrated in Figs. 2, 3 and 4. These spigots $j$ may be formed one after the other by means of an individual screw press or the like actuated at some convenient position, means being provided for rotating and securing the mold or jig $g$ in the proper position for the pressing out of the spigots consecutively, as each spoke arrives at or is brought opposite to the punching or pressing mechanism which may be mechanically operated, hydraulically or otherwise, suitable provision being made in the side of the mold or jig $g$, such as the holes $p$ through which the pressing tool passes, such holes $p$ being coincident or in alinement with the spokes $a$. It will be obvious also that the mold or jig may be placed within a series of mechanically operated punches situated around the circumference and opposite to each of the spokes, so that in a wheel for example provided with ten spokes, the ten spigots may be pressed into the ten spokes in one operation.

Referring to Figs. 2, 3 and 4, it will be seen on reference to Fig. 2 that the spoke threaded on to the projection $b$ of the hub $c$ extends to the inner surface or circumference of the rim $f$ in which may be provided holes $k$ immediately opposite to the center line of the spoke, but these holes are not essential. The punch m is now pressed by any suitable means forward toward the hub, and the portion of the rim f is pressed into the form of the spigot j, as clearly shown in Fig. 3. This operation secures the whole of the spokes, hub and rim in position, and the inner or outer ends of the said spokes may after removal from the mold or jig be autogenously welded to their respective spigots.

The spigot j is pressed out of the rim f while in its cold state, and it will be seen on reference to Fig. 4 what actually takes place, namely that by the insertion of the punch or pressing tool m the material of the rim itself, as represented by the double cross-hatched lines and marked n, is actually pressed into the form of a spigot j into the interior of the spoke a, the latter being supported and maintained in its true section by the support afforded by the die e situated within the mold or jig and adjacent to the interior circumference of the rim to be treated.

What I claim is:—

1. A method of manufacturing all-steel wheels which consists in assembling the spokes on the hub, placing the hub and spokes within the rim, and pressing spigots out of the material of the rim into the ends of the spokes.

2. A method of manufacturing all-steel wheels which consists in threading the spokes on projections on the hub, placing the hub and spokes within the rim, pressing spigots out of the material of the rim in a cold state into the ends of the spokes, and autogenously welding said projections and said spigots to the inner and outer ends of the said spokes.

3. A method of manufacturing all-steel wheels which consists in threading the spokes on projections on the hub, placing the hub and spokes within the rim, the outer ends of the spokes extending to the inner circumference of the rim, supporting said spokes on die blocks within a mold, and pressing spigots out of the material of the rim into the outer ends of said spokes.

4. A method of manufacturing all-steel wheels which consists in threading the spokes on projections on the hub, placing the hub and spokes within the rim, the outer ends of the spokes extending to the inner circumference of the rim, assembling said hub, spokes and rim within a mold, supporting said spokes by die-blocks within said mold, clamping said hub, spokes and rim within said mold by means of a cover-plate furnished with die-blocks registering with said first-mentioned die-blocks, and pressing material out of the rim in a cold state so as to form spigots projecting into the outer ends of said spokes.

5. A method of manufacturing all-steel wheels which consists in threading the spokes on projections on the hub, placing the hub and spokes within the rim, the outer ends of the spokes extending to the inner circumference of the rim, assembling said hub, spokes and rim within a mold, supporting said spokes by die-blocks within said mold, clamping said hub, spokes and rim within said mold by means of a cover-plate furnished with die-blocks registering with said first-mentioned die-blocks, pressing material out of the rim in a cold state so as to form spigots projecting into the outer ends of said spokes, and autogenously welding the said projections and the said spigots to the inner and outer ends of said spokes.

6. A method of manufacturing all-steel wheels which consists in threading the spokes on projections on the hub, assembling the hub, spokes and rim in proper relation within a mold, rotating said mold so as to bring each successive spoke opposite the pressing tool and consecutively pressing spigots from the material of the rim into the outer ends of each of said spokes.

7. A method of manufacturing all-steel wheels which consists in threading the spokes on projections on the hub, assembling the hub, spokes and rim in proper relation within a mold, and securing the said parts firmly together to form the complete wheel by pressing spigots out of the material of the rim into the outer ends of said spokes.

In testimony whereof I have signed my name to this specification in the presence of two subscribing witnesses.

FREDERICK ARTHUR ELLIS.

Witnesses:
ALEXANDER EDWARD BECK,
HENRY EDWARD DIXON.